(12) United States Patent
Park et al.

(10) Patent No.: US 10,551,666 B2
(45) Date of Patent: Feb. 4, 2020

(54) LIQUID CRYSTAL DISPLAY DEVICE

(71) Applicant: Samsung Display Co., Ltd., Yongin-si, Gyeonggi-do (KR)

(72) Inventors: Keun Woo Park, Yongin-si (KR); Jang Il Kim, Yongin-si (KR); Yeo Geon Yoon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/825,858

(22) Filed: Nov. 29, 2017

(65) Prior Publication Data

US 2018/0157109 A1    Jun. 7, 2018

(30) Foreign Application Priority Data

Dec. 5, 2016 (KR) .......................... 10-2016-164656

(51) Int. Cl.
*G02F 1/1335* (2006.01)
*G02F 1/1362* (2006.01)

(52) U.S. Cl.
CPC .. *G02F 1/133528* (2013.01); *G02F 1/136286* (2013.01); *G02F 1/133512* (2013.01)

(58) Field of Classification Search
CPC ......... G02F 1/133528; G02F 1/136286; G02F 1/133512; G02F 1/133555; G02F 1/133536; G02F 2001/133548
See application file for complete search history.

(56) References Cited

U.S. PATENT DOCUMENTS

| | | |
|---|---|---|
| 2008/0192346 A1 | 8/2008 | Kim et al. |
| 2010/0188747 A1* | 7/2010 | Amako ............... G02B 5/1842 359/485.05 |
| 2013/0242228 A1 | 9/2013 | Park et al. |
| 2014/0293187 A1* | 10/2014 | Nam .................. G02F 1/13362 349/62 |

* cited by examiner

*Primary Examiner* — Lucy P Chien
(74) *Attorney, Agent, or Firm* — Lewis Roca Rothgerber Christie LLP

(57) ABSTRACT

A liquid crystal display ("LCD") device includes: a first substrate having a first area that allows an image to be transmitted therethrough and a second area that blocks an image; a second substrate opposite to the first substrate; a liquid crystal layer between the first substrate and the second substrate; and a polarizing layer on the second substrate. The polarizing layer may include first polarizing patterns and second polarizing patterns, wherein, in a planar view, the first polarizing patterns overlap with the first area and the second polarizing patterns overlap with the second area.

14 Claims, 8 Drawing Sheets

LIQUID CRYSTAL DISPLAY DEVICE

CROSS-REFERENCE TO RELATED APPLICATIONS

This application claims priority to and the benefit of Korean Patent Application No. 10-2016-0164656, filed on Dec. 5, 2016, the entire content of which is incorporated by reference herein.

BACKGROUND

1. Field

One or more aspects of example embodiments of the present disclosure relate to a liquid crystal display device.

2. Description of the Related Art

A liquid crystal display ("LCD") device is one type of flat panel display devices widely used at present. In an LCD device, an image is displayed by changing alignment of liquid crystal molecules through formation of an electric field with application of different potentials to a pixel electrode and a common electrode of an LCD panel, and by controlling the amount of light transmittance therethrough.

Because the LCD panel of an LCD device is a light receiving device that does not emit light, LCD devices generally include a backlight unit for providing light to the LCD panel at the back surface of the LCD panel.

In addition, an LCD device may include a polarizing layer that allows light emitted from the backlight unit of an LCD to be selectively transmitted therethrough, and the polarizing layer may include a wire grid polarizer (WGP).

SUMMARY

Aspects of embodiments provide an LCD device for minimizing the number of parasitic capacitors formed between polarizing patterns of a polarizing layer and lines connected to pixels of the display.

According to some aspects of embodiments of the present disclosure, an LCD device is provided including a first substrate having a first area that allows an image to be transmitted therethrough and a second area that blocks an image, a second substrate opposite to the first substrate, a liquid crystal layer between the first substrate and the second substrate, and a polarizing layer on the second substrate. The polarizing layer may include first polarizing patterns and second polarizing patterns, wherein, in a planar view, the first polarizing patterns overlap with the first area, and the second polarizing patterns overlap with the second area.

The polarizing layer may be between the liquid crystal layer and the second substrate.

The LCD device may further include a black matrix between the liquid crystal layer and the first substrate, the black matrix located at a position corresponding to the second area of the first substrate.

The LCD device may further include a data line along a first direction on the polarizing layer, a gate line along a second direction intersecting the first direction on the polarizing layer, and a thin film transistor connected to the data line and the gate line.

In a planar view, the second polarizing patterns may overlap with the data line.

In a planar view, the second polarizing patterns may overlap with the gate line.

In a planar view, the second polarizing patterns may overlap with the thin film transistor.

In a planar view, some of the first polarizing patterns may overlap with at least one of the data line, the gate line, and the thin film transistor.

In some embodiments, the first polarizing patterns may extend along the first direction.

In some embodiments, the first polarizing patterns may be located at a certain distance along the second direction. The first polarizing patterns may be spaced apart from each other along the second direction with a distance d between adjacent first polarizing patterns.

In some embodiments, the first polarizing patterns may extend along the second direction.

In some embodiments, the first polarizing patterns may be located at a certain distance along the first direction. The first polarizing patterns may be spaced apart from each other along the first direction with a distance d between adjacent first polarizing patterns.

The first polarizing patterns and the second polarizing patterns may be located in the same layer.

The first polarizing patterns and the second polarizing patterns may be formed of the same material.

In a planar view, the first polarizing patterns may have an area wider than that of the second polarizing patterns.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
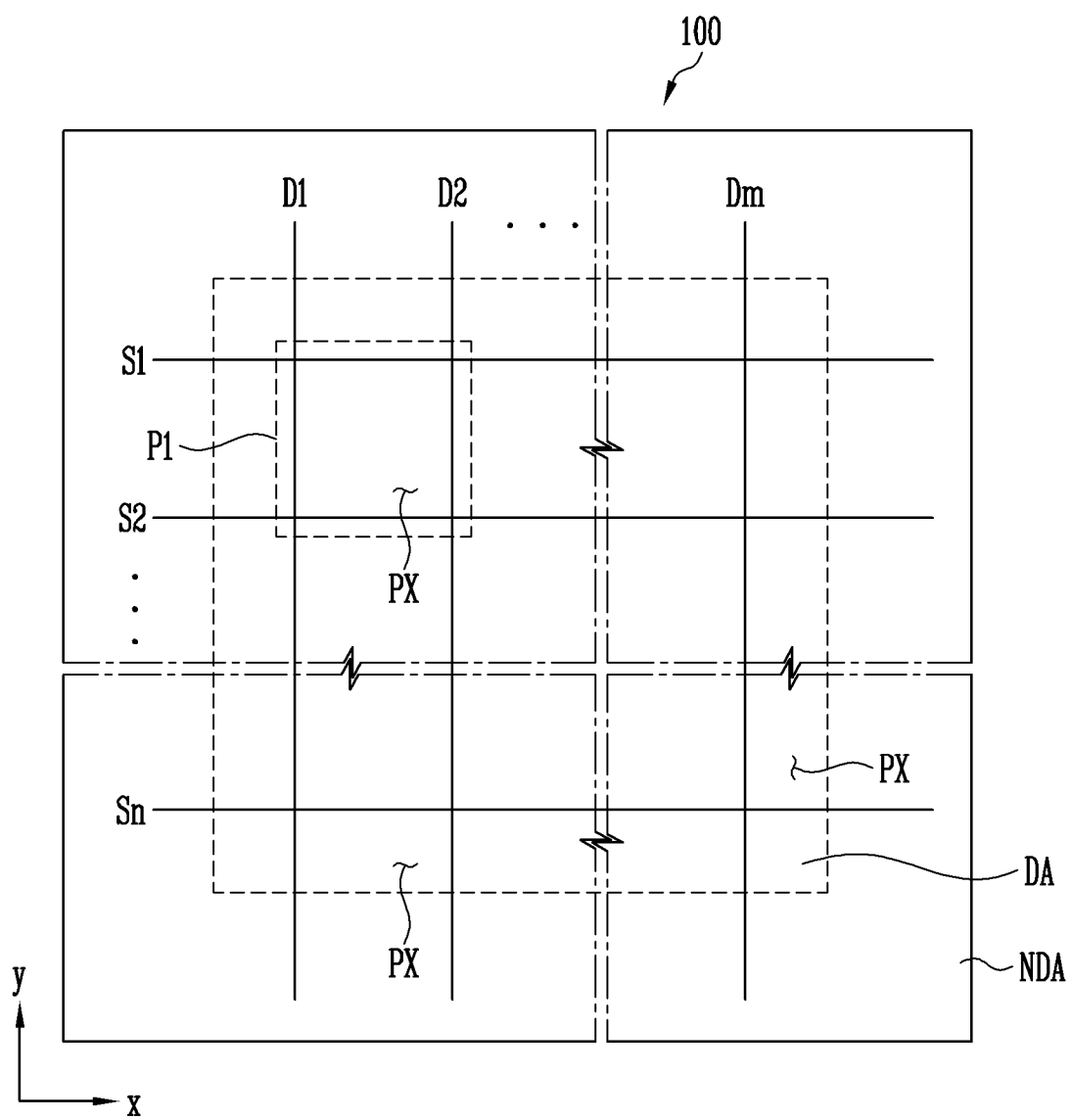
FIG. 1 is a schematic plan view of a display panel constituting a LCD device according to an embodiment of the present disclosure.

Hereinafter, exemplary embodiments of the present disclosure will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. In addition, it will also be understood that when an element or layer is referred to as being "between" two elements or layers, it can be the only element or layer between the two elements or layers, or one or more intervening elements or layers may also be present.

In the drawings, the thickness, ratio, and size of each element are exaggerated for clarity. As used herein, the term "and/or" includes any and all combinations of one or more of the associated listed items.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

It will be understood that, although the terms "first," "second," "third," etc., may be used herein to describe various elements, components, regions, layers and/or sections, these elements, components, regions, layers and/or sections should not be limited by these terms. The use of the terms first, second, etc. do not denote any order or importance, but rather the terms first, second, etc. are used to distinguish one element from another. Thus, a first element, component, region, layer or section discussed below could be termed a second element, component, region, layer or section without departing from the teachings of the present invention. It is to be understood that the singular forms "a," "an," and "the" include plural referents unless the context clearly dictates otherwise.

Expressions such as "at least one of," when preceding a list of elements, modify the entire list of elements and do not only modify the individual elements of the list. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be further understood that the terms "comprises," "comprising," "includes" and/or "including", when used in this specification, specify the presence of stated features, integers, steps, operations, elements, and/or components, but do not preclude the presence or addition of one or more other features, integers, steps, operations, elements, components, and/or groups thereof.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a schematic plan view of a display panel of an LCD device according to some embodiments of the present disclosure.

Referring to FIG. 1, the LCD panel according to some embodiments of the present disclosure includes a display panel 100 that displays an image.

The display panel 100 may include a display area DA in which an image is displayed and a non-display area NDA surrounding edges of the display area DA.

The display area DA may have a shape corresponding to the shape of the display panel 100 (e.g. square, rectangular or other shape), and the non-display area NDA may be provided on at least one side (e.g., edge) of the display area DA. In the embodiment depicted in FIG. 1, the non-display area NDA is provided in a shape surrounding the entire display area DA (e.g., surrounding each side or edge of the display area DA). However, it should be appreciated that in other embodiments, the non-display area NDA may be omitted from one or more sides of the display area DA.

Pixels PX may be arranged in the display area DA, and may each have the same or similar structure. A pixel PX is a minimum unit that displays an image, and may include an organic light emitting device that emits white light or colored light.

For example, the pixels PX may emit light of any one color among red, green, and blue. However, the present disclosure is not limited thereto, and in some embodiments, the pixels PX may emit light of any one color among cyan, magenta, and yellow.

The pixels PX may be arranged in a matrix form. For example, the pixels PX may be arranged in pixel columns with each column arranged in a first direction (e.g., the y-axis direction in FIG. 1), and arranged in pixel rows with each row arranged in a second direction (e.g., the x-axis direction in FIG. 1). However, the arrangement of the pixels PX is not particularly limited, and the pixels PX may be arranged in various forms.

The non-display area NDA may correspond to a bezel in the LCD device, and the width of the bezel may be determined according to the width of the non-display area NDA.

A data driver for providing a data signal to the pixels PX and data lines D1 to Dm for connecting the data driver to the pixels PX may be located in the non-display area NDA (e.g., at least partially located in the non-display area NDA). A gate driver for providing a gate signal to the pixels PX and gate lines S1 to Sn for connecting the gate driver to the pixels PX may also be located in the non-display area NDA (e.g., at least partially located in the non-display area NDA).

The data lines D1 to Dm and the gate lines S1 to Sn may extend from the non-display area NDA to the display area DA.

For example, the data lines D1 to Dm may extend along a first direction (e.g., the y-axis direction) in the display area DA and in the non-display area NDA (see FIG. 1), but the present disclosure is not limited thereto or thereby. For example, the data lines D1 to Dm may be bent in one area in the display area DA, and may extend in a direction inclined with respect to the direction of the pixel columns.

In some embodiments, each of the data lines D1 to Dm may be connected to all pixels PX respectively aligned on each pixel column, and the pixels PX on the same pixel column may share the same data line.

In addition, the gate lines S1 to Sn may extend along a second direction (e.g., the x-axis direction) in the display area DA (see FIG. 1), but the present disclosure is not limited thereto or thereby. For example, the gate lines S1 to Sn may be bent in one area in the display area DA, and may extend in a direction inclined with respect to the direction of the pixel rows.

In some embodiments, each of the gate lines S1 to Sn may be connected all pixels PX respectively aligned on each pixel row, and pixels PX on the same pixel row may share the same gate line.

Figure 2:
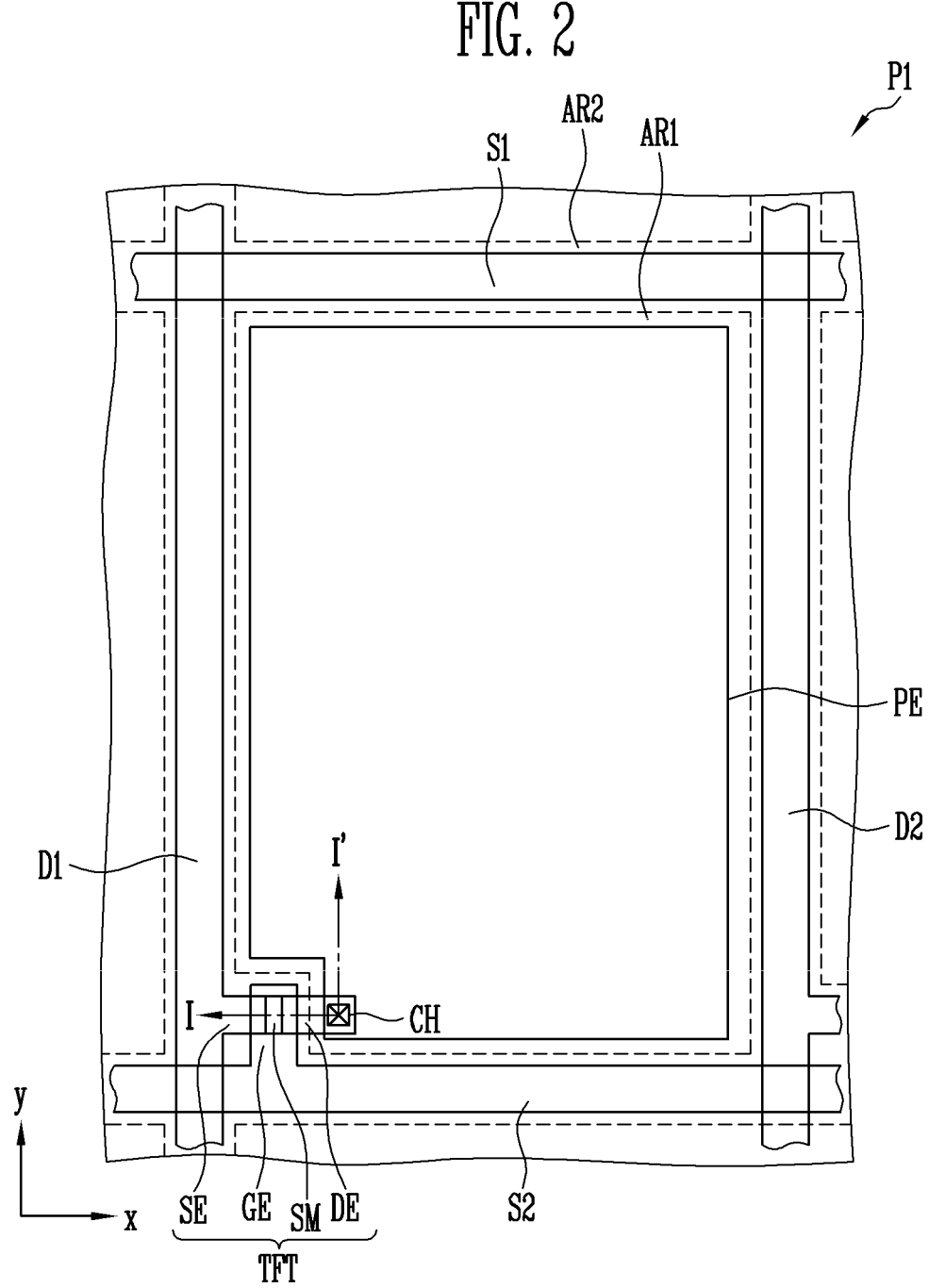
FIG. 2 is an enlarged view illustrating a portion P1 of the display panel shown in FIG. 1.
Figure 3:
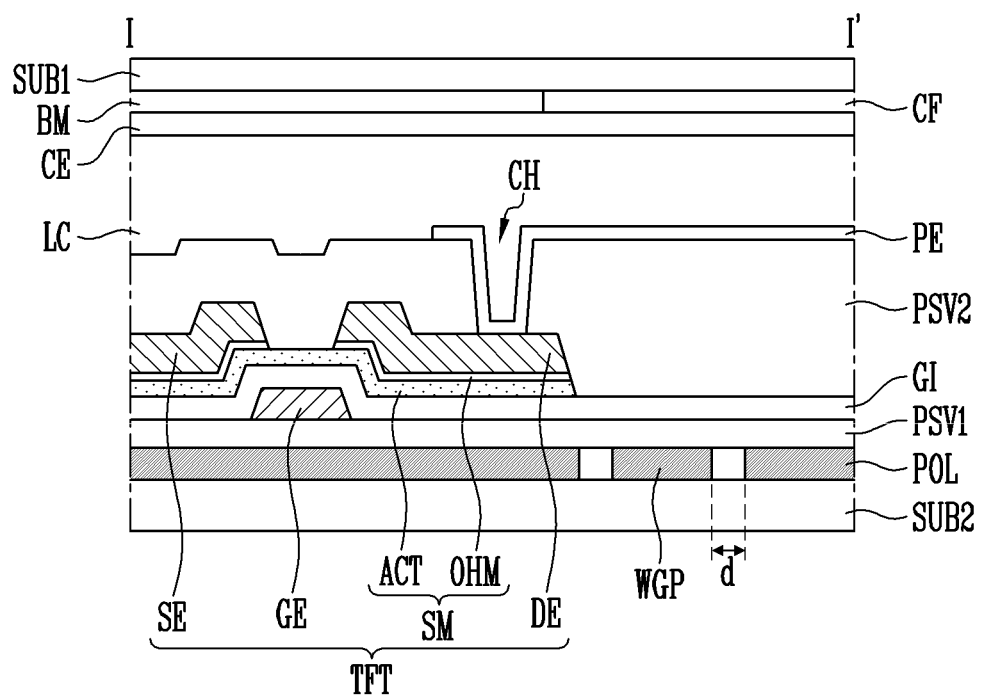
FIG. 3 is a sectional view taken along line I-I' shown in FIG. 2.

FIG. 2 is an enlarged view illustrating a portion P1 of the display panel shown in FIG. 1. FIG. 3 is a sectional view taken along line I-I' shown in FIG. 2.

Referring to FIG. 2, first and second data lines D1 and D2 may extend along a first direction (e.g., the y-axis direction), and first and second gate lines S1 and S2 may extend along a second direction (e.g., the x-axis direction) intersecting the first direction.

Referring further to FIG. 2, the portion P1 of the display panel 100 may include a first area AR1 in which an image is displayed, and a second area AR2 in which the image is not displayed. A pixel electrode PE may correspond to the first area AR1. In a planar view, the pixel electrode PE may be between the first and second data lines D1 and D2 and the first and second gate lines S1 and S2. In some embodiments, the first area AR1 may be wider than the pixel electrode PE (e.g., wider in the x-direction, see FIG. 2), however, the present disclosure is not limited thereto or thereby, and the first area AR1 may have an area equal to or narrower than the pixel electrode PE.

Each of the first and second data lines D1 to D2 and the first and second gate lines S1 and S2 may include a protrusion area, and a thin film transistor TFT may be formed in the protrusion area.

For example, a source electrode SE and a drain electrode DE may protrude from the first data line D1 and may be spaced apart from each other (e.g., in the x-direction). In addition, a gate electrode GE may protrude from the second gate line S2 (e.g., in the y-direction). In a planar view, the gate electrode GE may be between the source electrode SE and the drain electrode DE (e.g., in the x-direction). In addition, a portion of a semiconductor layer SM may overlap with the gate electrode GE. One end of the semiconductor layer SM may be connected to the source electrode SE, and a second end of the semiconductor layer SM may be connected to the drain electrode DE. The semiconductor layer SM may be implemented as a conductive channel between the source electrode SE and the drain electrode DE.

Referring to FIG. 3, the LCD device according to the embodiment of the present disclosure may include a first substrate SUB1, a second substrate SUB2 opposite to the first substrate SUB1, and a liquid crystal layer LC between the first substrate SUB1 and the second substrate SUB2.

Each of the first and second substrates SUB1 and SUB2 may be a rigid type base substrate or a flexible type base substrate. In addition, each of the first and second substrates SUB1 and SUB2 may have resistance (e.g., heat resistance) against damage during high temperature processing in a fabricating process for forming the LCD device.

For example, the material of the first and second substrates SUB1 and SUB2 may be one of a glass substrate, a quartz substrate, a glass ceramic substrate, and a crystalline glass substrate. Each of the first and second substrates SUB1 and SUB2 may be one of a film substrate and a plastic substrate, including a polymer organic material.

The first substrate SUB1 may include the first area AR1 that allows an image to be transmitted therethrough and the second area AR2 that blocks an image.

A polarizing layer POL may be on the second substrate SUB2. The polarizing layer POL may include polarizing patterns WGP.

The polarizing patterns WGP may be made of a conductive material, and may include a metal having a high reflexibility (i.e., light reflectance value). For example, the material of the polarizing patterns WGP may include one of aluminum, gold, silver, copper, chromium, iron, nickel, molybdenum, and any alloy thereof.

In some embodiments, the polarizing patterns WGP may have a single-layered structure including the metals, or a multi-layered structure in which two or more layers including the metals are stacked.

The polarizing patterns WGP may be arranged as a wire grid polarizer with patterns separated by a distance d. For example, the polarizing patterns WGP may have a height of 150 nm or more, and the distance d between the polarizing patterns WGP may be 100 nm or less.

A first protective layer PSV1 that covers the polarizing layer POL may be on the polarizing layer POL. In some embodiments, the material of the first protective layer PSV1 may include any one of silicon oxide (SiOx) and silicon nitride (SiNx).

The gate electrode GE that transmits a gate signal may be on the first protective layer PSV1. The material of the gate electrode GE may include any one of aluminum (Al), silver (Ag), copper (Cu), chromium (Cr), tantalum (Ta), titanium (Ti), and any alloy thereof.

A gate insulating layer GI may be located over the gate electrode GE. The gate insulating layer GI may include at least one of silicon nitride (SiNx) and silicon oxide (SiOx).

The semiconductor layer SM may be on the gate insulating layer GI. The semiconductor layer SM may include a semiconductor active layer ACT on the gate insulating layer GI and an ohmic contact layer OHM on the semiconductor active layer ACT.

The material of the semiconductor active layer ACT may include any one of amorphous silicon (a-Si), polycrystalline silicon (p-Si), and an oxide semiconductor. The oxide semiconductor may include at least one of zinc (Zn), indium (In), gallium (Ga), tin (Sn), and any mixture thereof. For example, the oxide semiconductor may include indium-gallium-zinc oxide (IGZO).

The ohmic contact layer OHM may have a shape branching off from the semiconductor active layer ACT and the source electrode SE or the drain electrode DE.

The source electrode SE and the drain electrode DE may be on the gate insulating layer GI and the semiconductor layer SM. The source electrode SE and the drain electrode DE may be connected to the semiconductor layer SM, and may be spaced apart from each other. In some embodiments, the source electrode SE and the drain electrode DE may be formed of the same material through the same fabrication process.

The gate electrode GE, the source electrode SE, the drain electrode DE, and the semiconductor layer SM may form one thin film transistor TFT, and a channel of the thin film transistor TFT may be formed in the semiconductor layer SM between the source electrode SE and the drain electrode DE. A partial region of the semiconductor layer SM, which is located between the source electrode SE and the drain electrode DE, may be a conductive channel.

A second protective layer PSV2 may be on the gate insulating layer GI, the source electrode SE, the semiconductor layer SM, and the gate electrode GE. The second protective layer PSV2 may include an organic material or an inorganic material. For example, the second protective layer PSV2 may include at least one of silicon oxide and silicon nitride, or include any one of acryl, polyimide (PI), polyamide (PA), and benzocyclobutene (BCB).

The second protective layer PSV2 may include a contact hole CH that allows the drain electrode DE to be exposed therethrough.

The pixel electrode PE may be on the second protective layer PSV2. The pixel electrode PE may be connected to the drain electrode DE through the contact hole CH.

The liquid crystal layer LC may be on the pixel electrode PE and the second protective layer PSV2.

A common electrode CE may be on the liquid crystal layer LC.

The liquid crystal layer LC is arranged in a specific direction by a voltage applied between the pixel electrode PE and a common electrode CE, to control the transmittance of light through the liquid crystal layer LC and thereby display an image.

In some embodiments, the drain electrode DE may provide a data voltage to the pixel electrode PE, and the common electrode CE may be provided with a reference voltage having a certain magnitude from the outside. In such embodiments, an electric field may be generated between the pixel electrode PE and the common electrode CE, and liquid crystal molecules may be rotated in a direction parallel to the direction of the electric field. The polarization of light transmitted through the liquid crystal layer LC may be changed corresponding to the rotation of the liquid crystal molecules.

A black matrix BM and a color filter CF may be on the liquid crystal layer LC. Further, an overcoat may be on the liquid crystal layer LC (e.g., between the liquid crystal layer LC and the color filter CF) to prevent the color filter CF from being exposed to liquid crystals and to provide a flat surface on the liquid crystal layer LC.

The color filter CF may form a predetermined color by using light incident thereinto. For example, the color filter CF may have any one color among red, green, blue, cyan, magenta, and yellow.

In some embodiments of the present disclosure, the color filter CF may be formed between the first substrate SUB1 and the liquid crystal layer LC (see FIG. 3). However, the present disclosure is not limited thereto or thereby, and the color filter CF may be formed, for example, between the liquid crystal layer LC and the second substrate SUB2. For example, the second protective layer PSV2 may include the color filter CF having any one color among red, green, blue, cyan, magenta, and yellow.

The black matrix BM may block an image generated and transmitted through the liquid crystals from passed into the non-display area NDA. The black matrix BM may be located at a position corresponding to the second area AR2 shown in FIG. 2.

The first substrate SUB1 may be on the black matrix BM.

Figure 4:
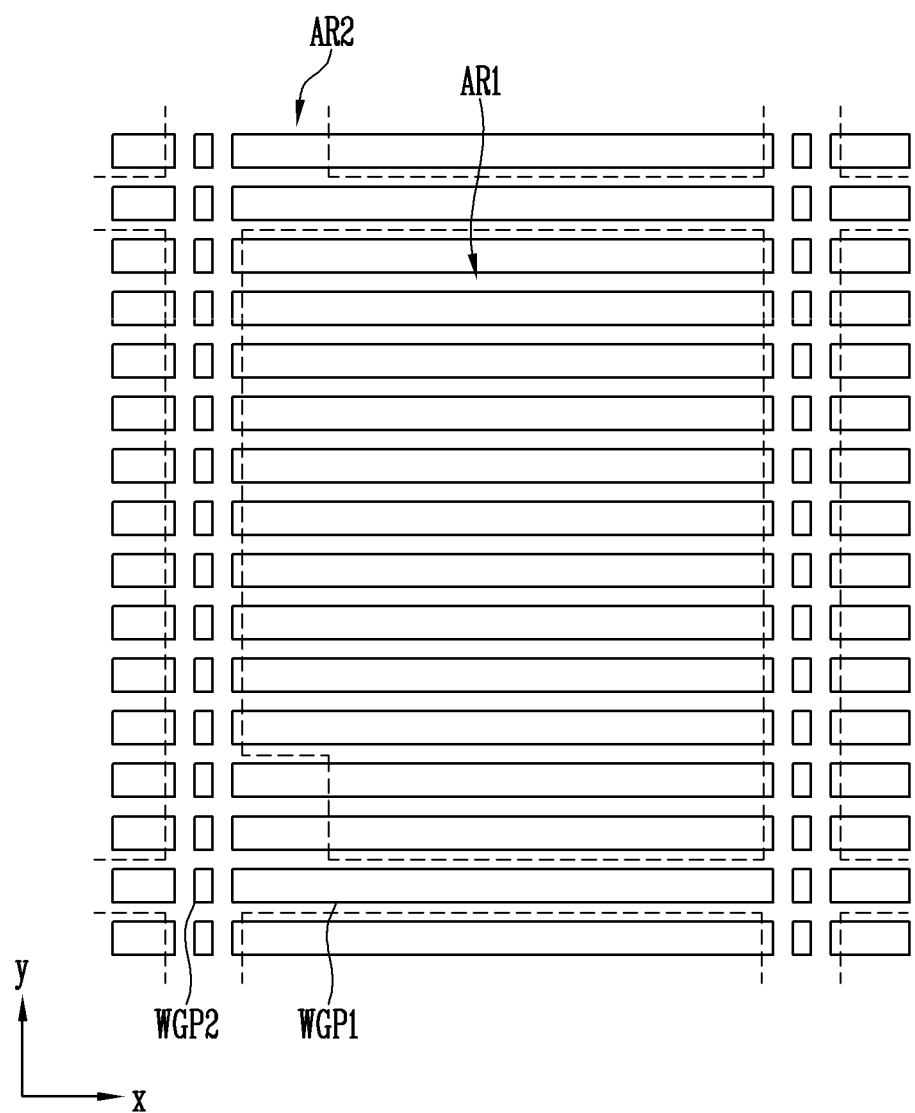
FIG. 4 is a layout view of polarizing patterns according to a first embodiment of the present disclosure.
Figure 5:
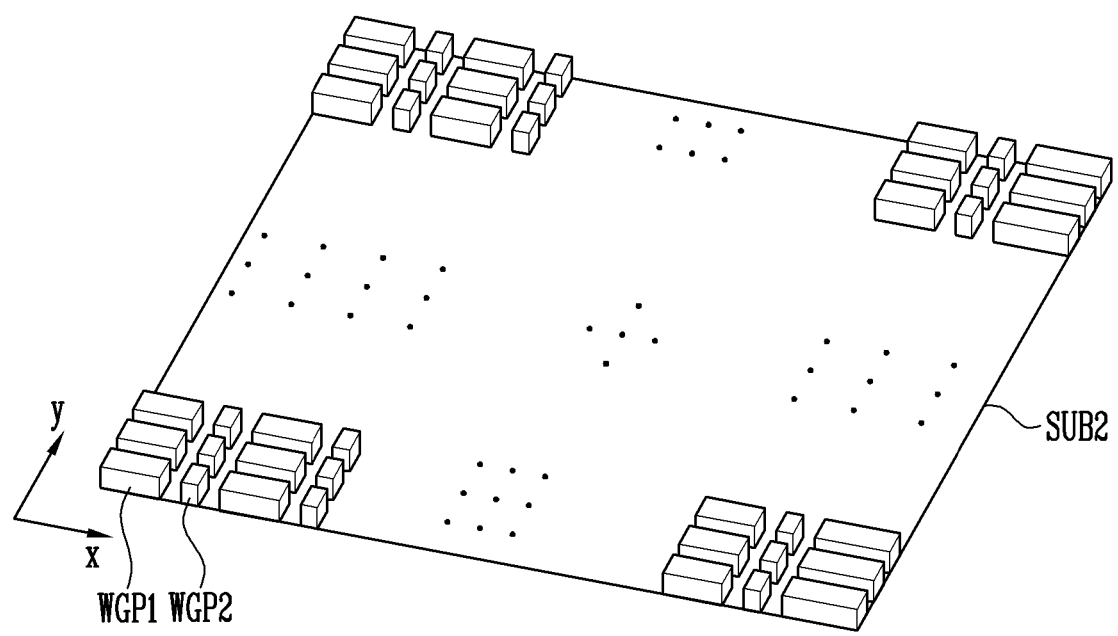
FIG. 5 is a perspective view illustrating the polarizing patterns according to the first embodiment of the present disclosure.

FIG. 4 is a layout view of polarizing patterns according to a first embodiment of the present disclosure. FIG. 5 is a perspective view illustrating the polarizing patterns according to the first embodiment of the present disclosure.

Referring to FIG. 4, first and second polarizing patterns WGP1 and WGP2 may be arranged in the polarizing layer POL, and may be arranged in a matrix form.

The first polarizing patterns WGP1 may serve as a polarizing plate that generates single polarized light by allowing one polarization component in light incident from the outside to be transmitted therethrough and by allowing another polarization component in the light to be reflected therefrom.

That is, the first polarizing patterns WGP1 may generate polarized light in a specific direction by allowing only light vibrating in the same direction as a polarization axis thereof to be transmitted therethrough, and by allowing other light to be reflected therefrom.

The first polarizing patterns WGP1 may extend in a second direction (e.g., the x-axis direction), and may be located at a certain (e.g., set) distance along a first direction (e.g., the y-axis direction). For example, the first polarizing patterns WGP1 may be spaced apart from each other along the first direction with a set distance between adjacent first polarizing patterns WGP1. The first polarizing patterns WGP1 may be located at a distance smaller than the wavelength of the incident light such that diffraction is not generated.

In some embodiments, the first polarizing patterns WGP1 may be located at different distances (e.g., along the first direction).

A first area AR1 is an area in which an image is displayed, and the first polarizing patterns WGP1 may be located in the first area AR1 to allow incident light into the liquid crystal layer LC. In addition, in order to block light leakage caused by a space between the first and second polarizing patterns WGP1 and WGP2 spaced apart from each other, a portion of the first polarizing patterns WGP1 in the first area AR1 may overlap with the second area AR2.

The second polarizing patterns WGP2 may be between the first polarizing patterns WGP1 (e.g., in the second direction), and may be located at a certain distance along the first direction (e.g., the y-axis direction). For example, the second polarizing patterns WGP2 may be spaced apart from each other along the second direction with a set distance between adjacent second polarizing patterns WGP2. The second polarizing patterns WGP2 may be formed in a floating structure (e.g., an isolated structure) in which the second polarizing patterns WGP2 are spaced from the first polarizing patterns WGP1.

In a planar view, the second polarizing patterns WGP2 may overlap with the second area AR2. That is, in a planar view, the second polarizing patterns WGP2 may overlap with a data line. Also, the second polarizing patterns WGP may overlap with the black matrix BM located on the liquid crystal layer LC. Thus, incident light transmitted through the second polarizing patterns WGP2 is blocked by the black matrix BM, and not displayed to the outside.

In some embodiments, the second polarizing patterns WGP2 may be located at different distances (e.g., along the first direction).

The first and second polarizing patterns WGP1 and WGP2 may be formed of the same material through the same fabrication process. Also, the first and second polarizing patterns WGP1 and WGP2 may be formed in the same layer of material.

The LCD device according to some embodiments of the present disclosure can prevent parasitic capacitance from being formed between the second polarizing patterns WGP2 and data lines, and will be described in more detail as follows.

According to the related art, when a data line and polarizing patterns overlap with each other in a planar view, parasitic capacitance may be formed between the polarizing patterns and the data line as a data signal is supplied through the data line.

However, in the embodiment shown in FIG. 4, when the second polarizing patterns WGP2 are separated from the first polarizing patterns WGP1 to have a floating structure, the area in which the second polarizing patterns WGP2 overlap with the data line can be minimized, and induction current generated in the second polarizing patterns WGP2 is not introduced into the first polarizing patterns WGP1. That is, in the LCD device according to some embodiments of the present disclosure, the second polarizing patterns WGP2 are formed in the floating structure, to minimize the number of parasitic capacitors formed between the data line and the second polarizing patterns WGP2.

Accordingly, in the LCD device according to some embodiments of the present disclosure, a data signal having a desired level can be stably supplied to the pixel PX.

In the embodiment depicted in FIG. 4, each of the first and second polarizing patterns WGP1 and WGP2 are provided in a rectangular shape, but the present disclosure is not limited thereto or thereby. For example, each of the first and second polarizing patterns WGP1 and WGP2 may be provided in various shapes such as a closed-shape polygon including linear sides, a circle, an ellipse, etc., including curved sides, and a semicircle, a semi-ellipse, etc., including linear and curved sides.

Referring to FIG. 5, the first and second polarizing patterns WGP1 and WGP2 may be arranged in a matrix form on the second substrate SUB2.

The first and second polarizing patterns WGP1 and WGP2 may be alternately located along the second direction (e.g., the x-axis direction), and each of the first and second polarizing patterns WGP1 and WGP2 may be sequentially located along the first direction (e.g., the y-axis direction).

In the embodiment depicted in FIG. 5, the first and second polarizing patterns WGP1 and WGP2 have the same height. However, the present disclosure is not limited thereto or thereby, and the first and second polarizing patterns WGP1 and WGP2 may have heights different from each other.

In addition, FIG. 5 illustrates the first and second polarizing patterns WGP1 and WGP2 as having the same width in a planar view. However, the present disclosure is not limited thereto or thereby, and may be modified and implemented such that the second polarizing patterns WGP2 are located at positions corresponding to the location of the data line. That is, when the data line is located along a direction different from the first direction, the second polarizing patterns WGP2 may be located at positions which overlap with the data line.

In addition, FIG. 5 illustrates the first and second polarizing patterns WGP1 and WGP2 as being parallel to each other. However, the present disclosure is not limited thereto or thereby, and the first and second polarizing patterns WGP1 and WGP2 may be positioned such that the first and second polarizing patterns WGP1 and WGP2 are not parallel to each other. For example, some of the first polarizing patterns WGP1 may extend along the second direction, and other first polarizing patterns WGP1 may extend in a direction intersecting the second direction.

Figure 6:
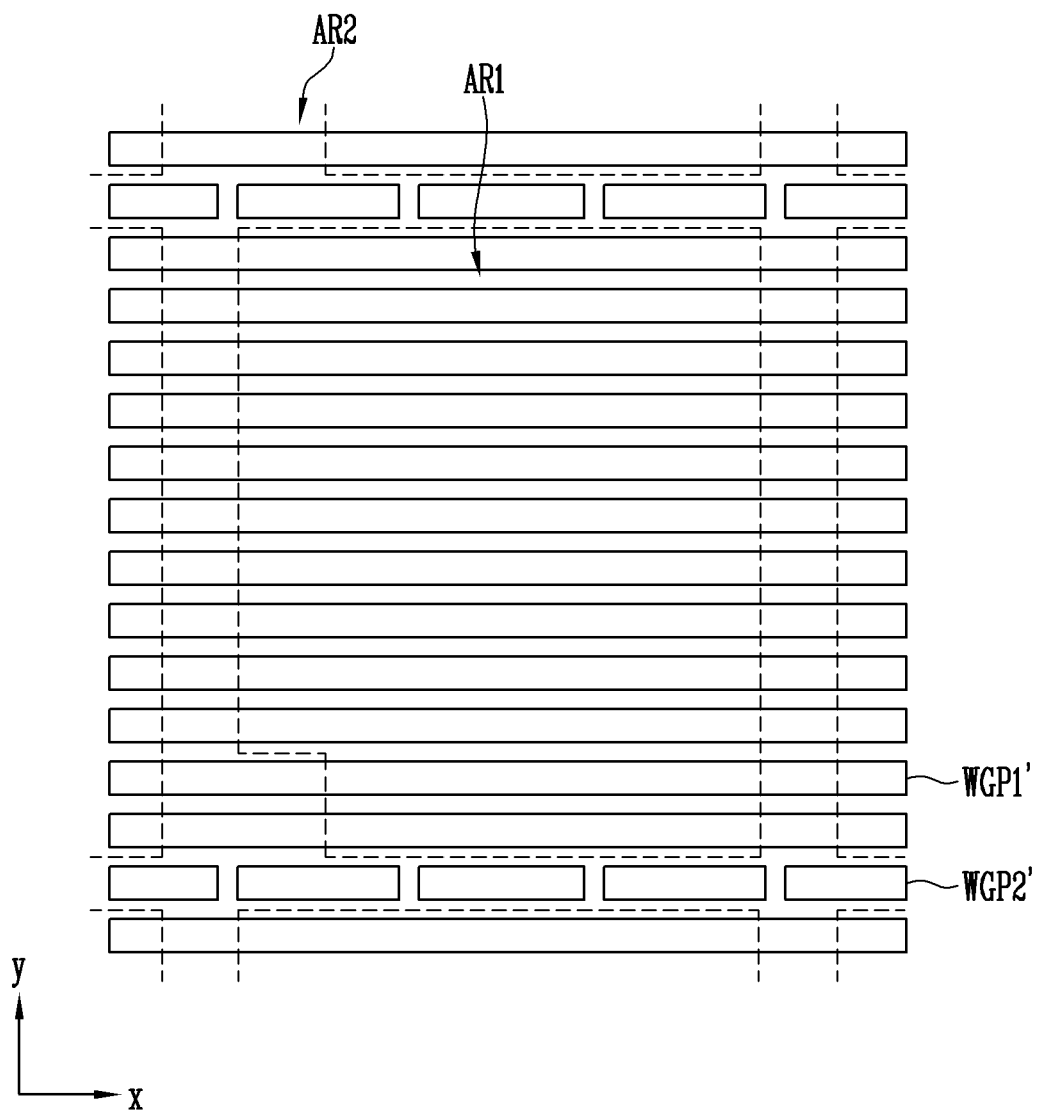
FIG. 6 is a layout view of polarizing patterns according to a second embodiment of the present disclosure.

FIG. 6 is a layout view of polarizing patterns according to a second embodiment of the present disclosure.

Differences of first and second polarizing patterns WGP1' and WGP2' shown in FIG. 6 from the first and second polarizing patterns WGP1 and WGP2 shown in FIG. 4 will be mainly described to avoid redundancy. Aspects of the embodiment of FIG. 6 that are the same or similar to the above-described embodiments will not be repeated. In addition, identical reference numerals refer to identical components, and similar reference numerals refer to similar components.

Referring to FIG. 6, the first and second polarizing patterns WGP1' and WGP2' may be arranged in the polarizing layer POL.

The second polarizing patterns WGP2' may be between the first polarizing patterns WGP1' (e.g., in the first direction), and may be arranged at a certain distance along a second direction (e.g., an x-axis direction). For example, the second polarizing patterns WGP2' may be spaced apart from each other along the second direction with a set distance between adjacent second polarizing patterns WGP2'. The second polarizing patterns WGP2' may be formed in a floating structure (e.g., an isolated structure) in which the second polarizing patterns WGP2' are spaced apart from the first polarizing patterns WGP1'.

In a planar view, the second polarizing patterns WGP2' may overlap with the second area AR2. That is, in a planar view, the second polarizing patterns WGP2' may overlap with a gate line, and may overlap with the black matrix BM on the liquid crystal layer LC. Thus, incident light transmitted through the second polarizing patterns WGP2' may be blocked by the black matrix BM, and not displayed to the outside.

In some embodiments, the second polarizing patterns WGP2' may be located at different distances (e.g., along the second direction).

The LCD device according to some embodiments of the present disclosure can prevent parasitic capacitance from being generated between the second polarizing patterns WGP2' and the gate line, and will be described in more detail as follows.

According to the related art, when a gate line and polarizing patterns overlap with each other in a planar view, parasitic capacitance may be formed between the polarizing patterns and the gate line as a gate signal is supplied through the gate line.

However, in the embodiment shown in FIG. 6, when the second polarizing patterns WGP2' are separated from the first polarizing patterns WGP1' to have a floating structure, the area in which the second polarizing patterns WGP2' overlap with the gate line can be minimized, and induction current generated in the second polarizing patterns WGP2' is not introduced into the first polarizing patterns WGP1'. That is, in the LCD device according to some embodiments of the present disclosure, the second polarizing patterns WGP2' are formed in the floating structure, to minimize the number of parasitic capacitors formed between the gate line and the second polarizing patterns WGP2'.

Accordingly, in the LCD device according to some embodiments of the present disclosure, a gate signal having a desired level can be stably supplied to the pixel PX.

Figure 7:
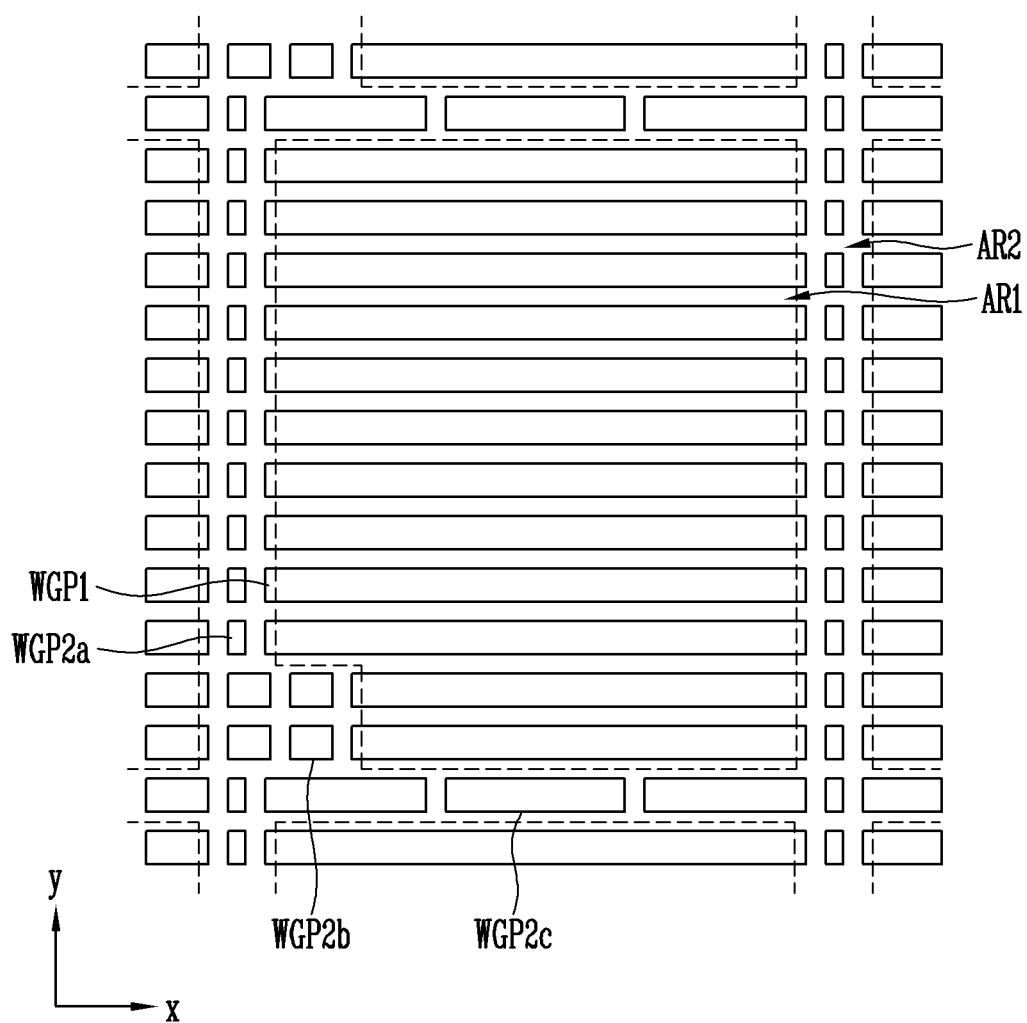
FIG. 7 is a layout view of polarizing patterns according to a third embodiment of the present disclosure.

FIG. 7 is a layout view of polarizing patterns according to a third embodiment of the present disclosure.

Differences of first and second polarizing patterns WGP1, WGP2a, WGP2b, and WGP2c shown in FIG. 7 from the first and second polarizing patterns WGP1 and WGP2 shown in FIG. 4 will be mainly described to avoid redundancy.

Referring to FIG. 7, first polarizing patterns WGP1 and second polarizing patterns WGP2a, WGP2b, and WGP2c may be arranged in the polarizing layer POL.

The second polarizing patterns WGP2a, WGP2b, and WGP2c may be between the first polarizing patterns WGP1. Each of the second polarizing patterns WGP2a, WGP2b, and WGP2c may be spaced apart from each other, and may be formed in a floating structure (e.g., an isolated structure) in which each of the second polarizing patterns WGP2a, WGP2b, and WGP2c are spaced apart from the first polarizing patterns WGP1.

In a planar view, the second polarizing patterns WGP2a, WGP2b, and WGP2c may overlap with the second area AR2.

That is, in a planar view, polarizing patterns WGP2a may overlap with the data line, polarizing patterns WGP2b may overlap with the thin film transistor TFT, and polarizing patterns WGP2c may overlap with the gate line.

The second polarizing patterns WGP2a, WGP2b, and WGP2c may overlap with the black matrix BM on the liquid crystal layer LC, and thus incident light transmitted through the second polarizing patterns WGP2a, WGP2b, and WGP2c may be blocked by the black matrix BM, and not displayed to the outside.

The LCD device according to some embodiments of the present disclosure can prevent parasitic capacitance from being formed by the second polarizing patterns WGP2a, WGP2b, and WGP2c.

In the embodiment shown in FIG. 7, the second polarizing patterns WGP2a, WGP2b, and WGP2c are formed in the floating structure, to minimize the area in which second polarizing patterns WGP2a, WGP2b, and WGP2c overlap with the data line, the thin film transistor TFT, and the gate line. In addition, the floating structure of the second polarizing patterns WGP2a, WGP2b, and WGP2c prevent induction current generated in some of the second polarizing patterns WGP2a, WGP2b, and WGP2c from being introduced into the others of the second polarizing patterns WGP2a, WGP2b, and WGP2c or the first polarizing patterns WGP1.

Accordingly, in the LCD device according to some embodiments of the present disclosure, a data signal having a desired level and a gate signal having a desired level can be stably supplied to the pixel PX, and the pixel Px can emit light with a luminance corresponding to the data signal.

In the embodiment depicted in FIG. 7, the second polarizing patterns WGP2a, WGP2b, and WGP2c have different widths. However, the present disclosure is not limited thereto or thereby, and at least some of the second polarizing patterns WGP2a, WGP2b, and WGP2c may have the same width. In addition, the second polarizing patterns WGP2a, WGP2b, and WGP2c may be spaced apart from each other at different distances.

Figure 8:
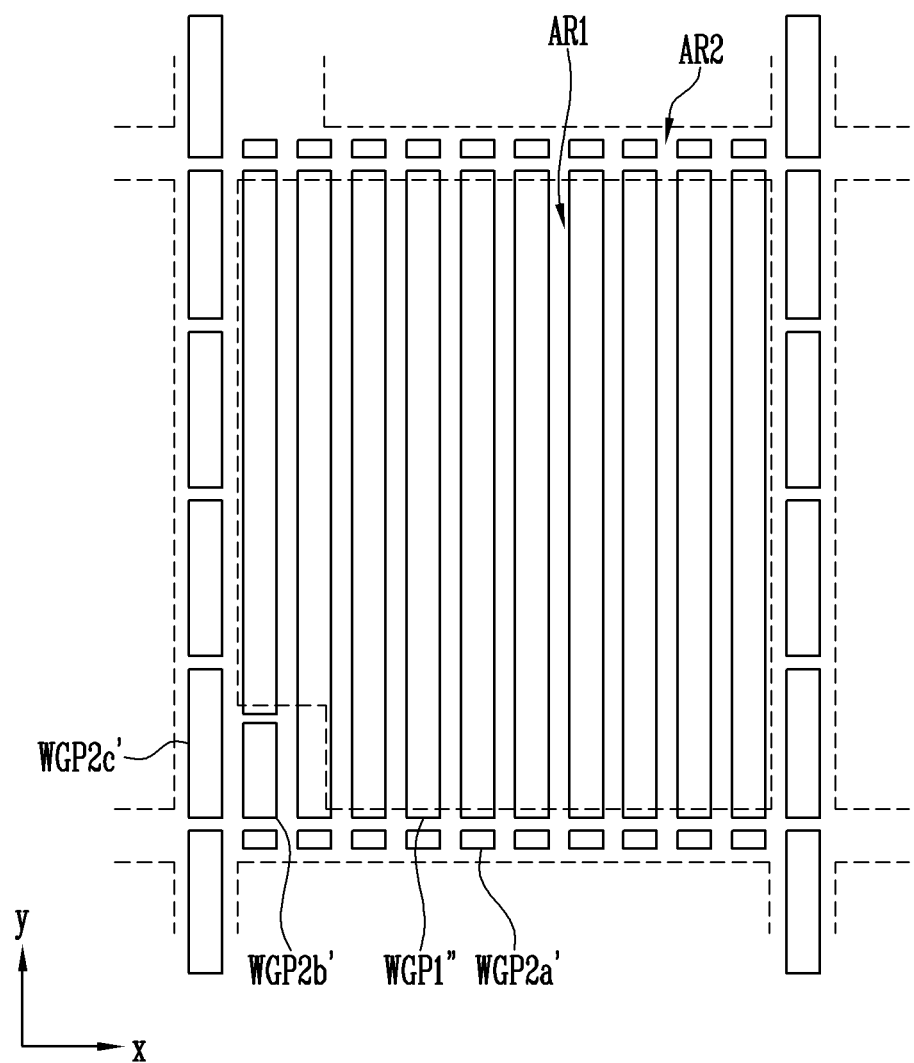
FIG. 8 is a layout view of polarizing patterns according to a fourth embodiment of the present disclosure.

FIG. 8 is a layout view of polarizing patterns according to a fourth embodiment of the present disclosure.

Referring to FIG. 8, differences of first and second polarizing patterns WGP1", WGP2a', WGP2b', and WGP2c' from the first and second polarizing patterns WGP1, WGP2a, WGP2b, and WGP2c shown in FIG. 7 will be mainly described to avoid redundancy.

The first polarizing patterns WGP1" may extend along a first direction (e.g., a y-axis direction), and may be located at a certain distance along a second direction (e.g., an x-axis direction). For example, the first polarizing patterns WGP" may be spaced apart from each other along the second direction with a set distance between adjacent first polarizing patterns WGP1".

In order to block light leakage caused by a space between the first polarizing patterns WGP1" and the second polarizing patterns WGP2a', WGP2b', and WGP2c', some of the first polarizing patterns WGP1" may overlap with the first area AR1 and with the second area AR2.

The second polarizing patterns WGP2a', WGP2b', and WGP2c' may be between the first polarizing patterns WGP1". Each of the second polarizing patterns WGP2a', WGP2b', and WGP2c' may be spaced apart from each other, and may be formed in a floating structure (e.g., an isolated structure) in which each of the second polarizing patterns WGP2a', WGP2b', and WGP2c' are spaced apart from the first polarizing patterns WGP1".

In a planar view, the second polarizing patterns WGP2a', WGP2b', and WGP2c' may overlap with the second area AR2.

That is, in a planar view, polarizing patterns WGP2a' may overlap with the gate line, polarizing patterns WGP2b' may overlap with the thin film transistor TFT, and polarizing patterns WGP2c' may overlap with the data line.

The second polarizing patterns WGP2a', WGP2b', and WGP2c' may overlap with the black matrix BM on the liquid crystal layer LC, and thus incident light transmitted through the second polarizing patterns WGP2a', WGP2b', and WGP2c' may be blocked by the black matrix BM, and not displayed to the outside.

In the LCD device according to the present disclosure, some of the polarizing patterns may be formed in a floating structure (e.g., an isolated structure), to minimize the number of parasitic capacitors formed between the polarizing patterns.

Example embodiments have been disclosed herein, and although specific terms are employed, they are used and are to be interpreted in a generic and descriptive sense only, and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Therefore, the disclosed subject matter should not be limited to any single embodiment described herein, and the above-described embodiments are to be considered illustrative and not restrictive. Accordingly, it will be understood by those of skill in the art that various changes in form and details may be made without departing from the spirit and scope of the present disclosure as set forth in the following claims, and equivalents thereof.

What is claimed is:

1. A liquid crystal display device comprising:
   a first substrate comprising a first area that allows an image to be transmitted therethrough and a second area that blocks an image;
   a second substrate opposite to the first substrate;
   a liquid crystal layer between the first substrate and the second substrate; and
   a polarizing layer on the second substrate,
   wherein the polarizing layer comprises first polarizing patterns and second polarizing patterns, and
   wherein, in a planar view, the first polarizing patterns overlap with the first area, the second polarizing patterns overlap with the second area, and the second polarizing patterns are spaced apart from the first polarizing patterns,
   wherein, in a planar view, the first polarizing patterns extend along a first direction, and the second polarizing patterns are spaced apart from the first polarizing patterns in the first direction, and
   wherein, in a planar view, at least one of the second polarizing patterns is between the first polarizing patterns.

2. The liquid crystal display device of claim 1, wherein the polarizing layer is between the liquid crystal layer and the second substrate.

3. The liquid crystal display device of claim 1, further comprising a black matrix between the liquid crystal layer and the first substrate, the black matrix located at a position corresponding to the second area of the first substrate.

4. The liquid crystal display device of claim 1, further comprising:
   a data line along the first direction on the polarizing layer;
   a gate line along a second direction intersecting the first direction on the polarizing layer; and
   a thin film transistor connected to the data line and the gate line.

5. The liquid crystal display device of claim 4, wherein, in a planar view, the second polarizing patterns overlap with the data line.

6. The liquid crystal display device of claim 4, wherein, in a planar view, the second polarizing patterns overlap with the gate line.

7. The liquid crystal display device of claim 4, wherein, in a planar view, the second polarizing patterns overlap with the thin film transistor.

8. The liquid crystal display device of claim 4, wherein, in a planar view, some of the first polarizing patterns overlap with at least one of the data line, the gate line, and the thin film transistor.

9. The liquid crystal display device of claim 1, wherein the first polarizing patterns are spaced apart from each other along a second direction intersecting the first direction, with a distance d between adjacent first polarizing patterns.

10. The liquid crystal display device of claim 1, wherein the first polarizing patterns and the second polarizing patterns are in the same layer.

11. The liquid crystal display device of claim 1, wherein the first polarizing patterns and the second polarizing patterns are formed of the same material.

12. The liquid crystal display device of claim 1, wherein, in a planar view, the first polarizing patterns have an area wider than that of the second polarizing patterns.

13. A liquid crystal display device comprising:
    a first substrate comprising a first area that allows an image to be transmitted therethrough and a second area that blocks an image;
    a second substrate opposite to the first substrate;
    a liquid crystal layer between the first substrate and the second substrate; and
    a polarizing layer on the second substrate,
    wherein the polarizing layer comprises first polarizing patterns and second polarizing patterns,
    wherein, in a planar view, the first polarizing patterns overlap with the first area, and the second polarizing patterns overlap with the second area, and the second polarizing patterns are spaced apart from the first polarizing patterns, and
    wherein, in a planar view, the first polarizing patterns extend along a first direction, and the second polarizing patterns are spaced apart from the first polarizing patterns in the first direction, and
    wherein, in a planar view, at least one of the first polarizing patterns is collinear with at least one of the second polarizing patterns in the first direction.

14. A liquid crystal display device comprising:
    a first substrate comprising a first area that allows an image to be transmitted therethrough and a second area that blocks an image;
    a second substrate opposite to the first substrate;
    a liquid crystal layer between the first substrate and the second substrate; and
    a polarizing layer on the second substrate,
    wherein the polarizing layer comprises first polarizing patterns and second polarizing patterns,
    wherein, in a planar view, the first polarizing patterns overlap with the first area, and the second polarizing patterns overlap with the second area, and the second polarizing patterns are spaced apart from the first polarizing patterns, and wherein, in a planar view, the first polarizing patterns extend along a first direction, and the second polarizing patterns are spaced apart from the first polarizing patterns in the first direction, and wherein, in a planar view, at least two of the second polarizing patterns are spaced apart from each other and at least one of the first polarizing patterns has a different shape than at least one of the second polarizing patterns.

* * * * *